3,523,779
Patented Aug. 11, 1970

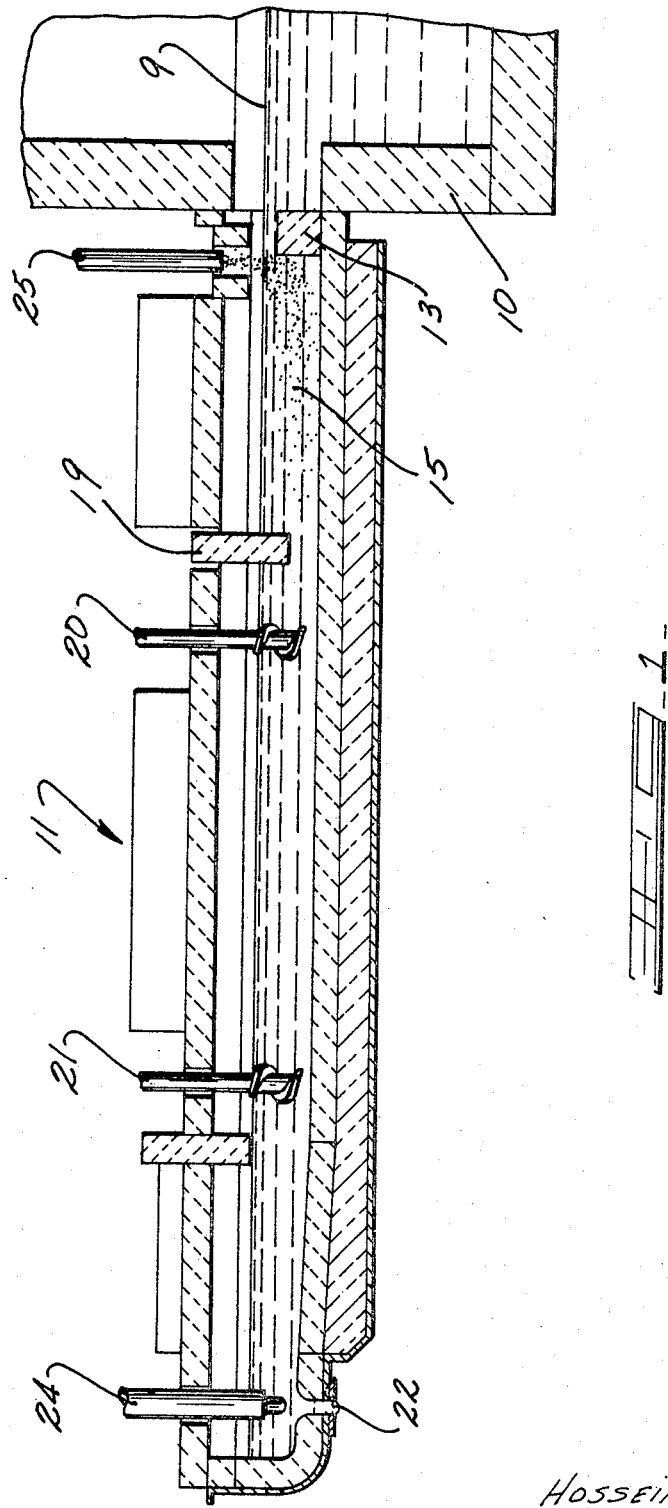

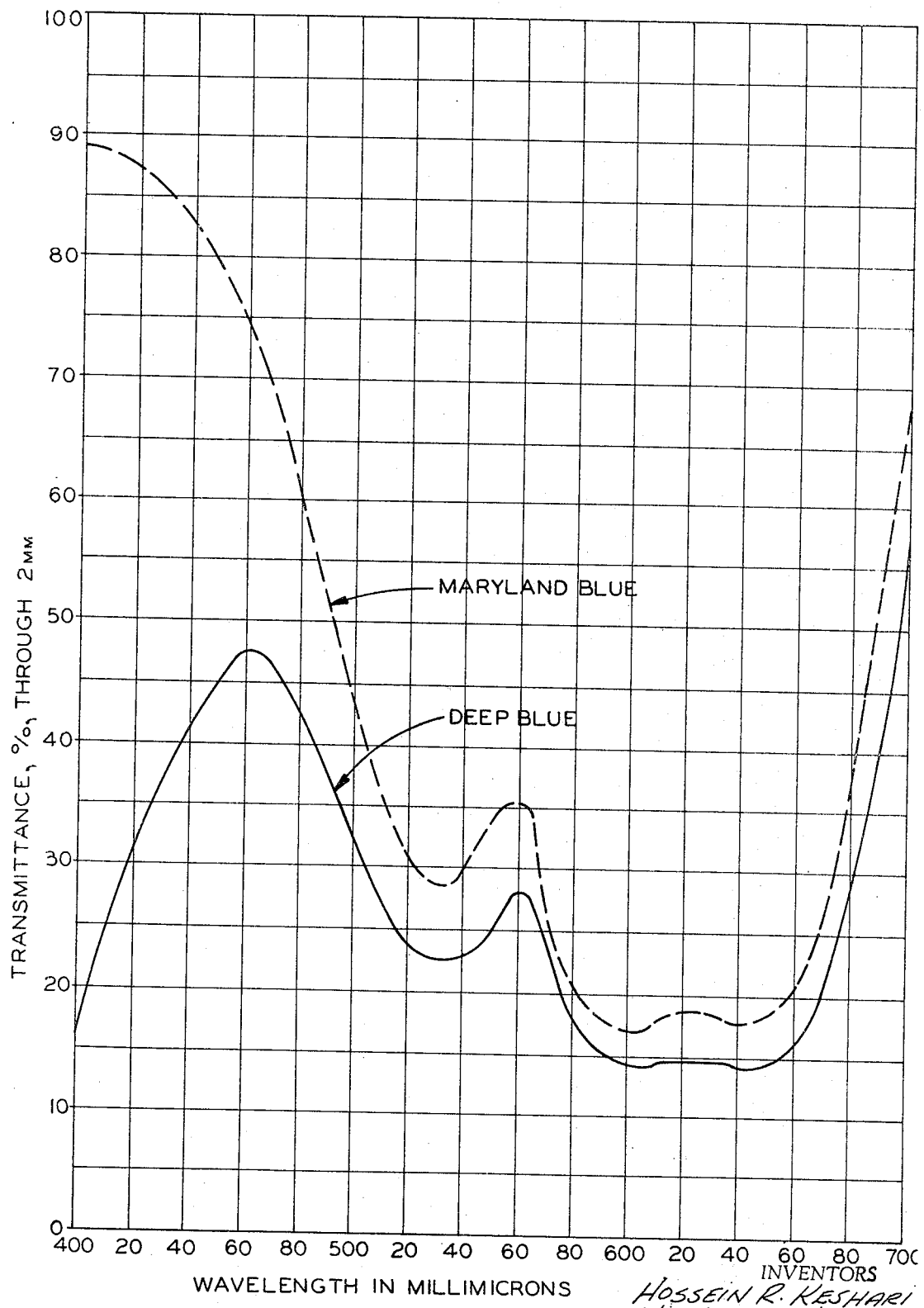

3,523,779
GLASS COMPOSITION AND METHOD
Hossein R. Keshari and William F. Mahoney, Toledo,
Ohio, assignors to Owens-Illinois, Inc., a corporation
of Ohio
Filed Nov. 15, 1965, Ser. No. 507,952
Int. Cl. C03c 3/24
U.S. Cl. 65—134                                      8 Claims

ABSTRACT OF THE DISCLOSURE

A soda-lime frit glass composition containing chromium and cobalt in proportioned amounts on an oxide basis ranging between about a maximum of 1.5–2.2 weight percent total chrome oxide calculated as $Cr_2O_3$, about 0.3–0.6 weight percent hexavalent chrome oxide calculated as $CrO_3$, the amount of trivalent chrome oxide being adjusted to accommodate the amount of hexavalent chrome oxide, and from about 2.2–3.0 weight percent of oxides of cobalt, and a method of producing soda-lime possessing enhanced properties of absorbency to light in the short-wave visible and ultraviolet regions of the spectrum including dissolving in a molten mass of slightly oxidized soda-lime glass chromium and cobalt constituents in amounts producing a resultant soda-lime glass possessing an oxide composition, including 0.003–0.01 $CrO_3$ and 0.03–0.06 total chromium as $Cr_2O_3$, and 0.03–0.1 percent by weight of oxides of cobalt.

---

This invention relates to the manufacture of colored glasses; more particularly, the invention relates to highly colorant enriched blue frit glass batch compositions, and to the vitreous composition made therefrom. Also, the invention relates to a method of manufacturing blue composite glasses using said blue frit glasses of the invention.

In conventional operations for producing colored glasses, one of the very substantial problems encountered is in changing a glass melting tank over from one color to another, or from a colorless to a colored glass making operation.

The problem arises from the fact that, for example, the first color composition must be dumped and the tank refilled with a second color composition. Usually the tank change is so scheduled as to permit product run-out over as large a portion of the transition as possible. However, there is an intermediate interval of one to three days duration, wherein the prior color tails out and the new color begins, in which the glass composition is in transition and as such must be dumped. This transition glass is off-color and unsuited for commercial utilization. Considering the fact that glass melting tanks hold up to 100 tons of melt or more, it will be understood that the transition caused by dumping is very expensive.

This, of course, brings to mind an ideal situation where a colorless base glass composition would be used in the tank and colorant, as desired is added at the forehearth to fulfill specific end-color requirements. By so operating, the conditions of firing of the tank and the feeding of batch ingredients into the tank would all become substantially fixed factors. Careful adjustment and stabilization of tank conditions would lead to the production of high quality products. The tank conditions, once stabilized, would remain so and variables would be avoided.

Such a forehearth coloring method has important advantages over the tank method for producing colored glass, in which the colorant material is added to the base glass batch and introduced directly into the melting and refining tank. Thus, by the forehearth method, as many colors can be produced simultaneously as there are forehearths associated with the melting furnace.

Further, in a given forehearth, a transition from one color to another can be made in a matter of one to three hours, as contrasted to a matter of one to three days to change a tank from one color to another.

Also, if desired, both clear and colored glassware can be made simultaneously from the same melting tank, by using different forehearths, and adding colorant frit glass to some, and running the clear base glass through others.

In manufacturing the blue glass by techniques of the present invention, it is desirable to achieve high pulls, or production rates, from a selected forehearth or forehearths utlizing the invention. This may be achieved up to 40 tons per operating day under the one modification herein disclosed.

Further, smaller quantities of colorant material are required by the forehearth coloring method than by the known melting-tank practice where the colorant is incorporated into the tank batch and melted with substantial losses of volatile colorant material during the extended melting and refining operation.

Additionally, the manufacture of deep blue glasses by conventional methods has presented serious economic problems because of inefficient use of fuel. These glasses have an absorption band in the near infrared causing much of the radiant energy of the flames to be absorbed in the upper layer of molten glass. Since commercial melting furnaces are designed to accommodate a depth of several feet of molten glass, heat transmission is a serious problem. Since colorless flint glass has a high transmission in the near infrared region of the spectrum, the present invention permits a substantial reduction in melting costs by permitting the blue colorants to be added after the melting has been completed.

It is well-known in the art that common blue glass compositions exhibit very little absorption in the ultraviolet region of the spectrum. This means that the contents of ordinary blue glass containers are subject to exposure to ultraviolet and short wave radiation within the visible spectrum. In the case of comestible products marketed in glass containers, the deterioration in taste of beer, wine, ale and orange-flavored soft drinks, the development of rancidity in cooking oils and the loss of vitamin C content in milk have been traced to exposure to the aforesaid short-wave visible and ultraviolet radiation.

It is therefore an object of the present invention to provide a novel blue glass composition that exhibits substantial absorption in the short-wave radiation of the visible and ultraviolet ranges.

It is another object of the invention to provide a novel colorant frit glass composition that will produce a deep blue color when added to a substantially colorless base glass.

Another important object is to provide a method of adding the colored frit glass to the bulk stream of molten glass while the molten glass is flowing through the forehearth to the forming equipment.

Still another object is to provide a frit glass composition that is capable of readily admixing with a colorless soda-lime base glass in the forehearth of a conventional furnace so as to permit pull rates of up to 40 tons per operating day.

Another object of this invention is to provide a method of producing a glass composition possessing a deep blue coloration without the heat transfer problems normally associated with the melting and fining of deep blue batch materials.

Still a further object of this invention is to provide a colored frit glass composition that is capable of admixing with an essentially colorless base glass to form a deep blue color in the aforesaid base glass through the presence of oxides of hexavalent chrome, trivalent chrome, and cobalt in proper combination.

In attaining the objects of this invention, one feature resides in the preparation of a frit glass containing, in addition to the ordinary glass forming oxides, sufficient $Cr_2O_3$, $CrO_3$ and $CoO$ in proper combination to produce a deep blue coloration. The frit glass should also contain sufficient alkali oxides to facilitate the dissolution of $Cr_2O_3$ when the frit glass is subsequently admixed with the base glass.

Another feature resides in admixing the aforesaid frit, under proper conditions of agitation, in the forehearth of a commercial glass melting furnace, with an essentially colorless soda-lime base glass composition to produce the desired blue coloration.

The above and other objects, features and advantages of the present invention will become apparent to those skilled in the art upon reading the detailed description contained herein.

FIG. 1 is a longitudinal sectional elevational view, partially diagrammatic, of an apparatus which may be used in practicing the method of the present invention.

FIG. 2 is a graphic representation depicting, by comparison, the transmittance characteristics of standard Maryland Blue Grass and a glass prepared in accordance with the concepts of the present invention.

The apparatus includes a furnace tank 10 in which the base glass is melted and refined. A plurality of forehearths such as the depicted forehearth 11, may be provided in connection with the tank. The molten glass 9, herein referred to as the base glass, flows from the tank over a dam 31 into a channel extending the length of the forehearth. The frit material which is supplied in regulated amounts to the forehearth is discharged by gravity from a suitable container (not shown) through a spout or spouts 25. The frit during its passage through a melting section 15 of the forehearth is melted and mixed to some extent with base glass. The mixture flows beneath a skimmer block 19. Stirring devices 20 and 21 effect further mixing of the glass and colorant constituents, resulting in a homogeneous glass which is discharged through an outlet 22. The discharge of the glass is under the control of a feeder mechanism 24 by which measured charges or gobs of glass emanating from the outlet 22 are severed from the supply body and delivered to the molds of a forming machine.

The glass which is added to the base glass flowing from the tank 10 is supplied in one form as a solid frit produced by melting the raw batch materials, cooling and reducing them to a powdered or granulated frit form, as by introducing the melted raw batch materials directly into a body of water. In its finely particulated form, the frit is absorbed and melted in the forehearth at a temperature much lower than that required for melting the raw batch forming the base glass.

In another form, the frit may be added in molten state. It is, therefore, contemplated herein that the term "frit" may include either form of the colorant glass material.

The amount of frit entering the forehearth is usually only a small fraction of the amount of base glass flowing from the tank 10, the proportion depending upon the composition of the frit, the intensity of the color desired in the end product, or other variable factors. In general, the ratio of base glass to frit usually varies from about 20 to 1 to 80 to 1 or from about 1 percent to about 5 percent by weight of frit glass based on the base glass.

The above-described apparatus is only exemplary of several forms of apparatus which may be used in practicing the invention, and illustrates, rather schematically, the adoption of the method to existing forehearth constructions. For another suitable apparatus for mixing colorants in the glass furnace forehearth, see U.S. Pat. No. 3,057,175, R. R. Rough et al., issued on Oct. 9, 1962.

THE FRIT GLASS OF INVENTION AND METHOD OF PREPARATION

TABLE I.—BATCH DATA FOR FRIT GLASSES

| Component | Example I | Example II | Example III |
|---|---|---|---|
| Sand (lb.) | 2,000 | 2,000 | 2,000 |
| Soda ash (lb.) | 1,151 | 1,172 | 1,158 |
| Limestone (lb.) | 559 | 559 | 557 |
| Potassium (lb.) | 134 | 98 | 122 |
| Dichromate (oz.) | 12.5 | 1 | 12 |
| Black cobalt (lb.) | 101 | 81 | 94 |
| Oxide (oz.) | 13 | 7 | 13 |

TABLE II.—COMPOSITIONAL DATA FOR FRIT GLASSES IN PERCENT BY WEIGHT

| Theoretical chemical analysis | Example | | | Operable range |
|---|---|---|---|---|
| | I | II | III | |
| $SiO_2$ | 62.70 | 63.46 | 62.95 | 60–65 |
| $Al_2O_3$ | 0.07 | 0.07 | 0.07 | 0.0–0.10 |
| $Fe_2O_3$ | 0.025 | 0.026 | 0.025 | 0.0–0.05 |
| $CaO$ | 9.00 | 9.13 | 9.04 | 8.5–9.5 |
| $MgO$ | 0.67 | 0.67 | 0.67 | 0.0–1.0 |
| $Na_2O$ | 20.98 | 21.61 | 21.19 | 18.0–23.0 |
| $K_2O$ | 1.37 | 1.01 | 1.25 | 0.0–2.0 |
| Total Cr as $Cr_2O_3$ | 2.2 | 1.61 | 2.00 | 1.5–2.2 |
| $CoO$ | 2.99 | 2.42 | 2.80 | 2.2–3.0 |

TABLE III.—ACTUAL COMPOSITION OF COLORANTS IN FRIT GLASSES IN PERCENT BY WEIGHT

| Colorant | Example | | | Operable range |
|---|---|---|---|---|
| | I | II | III | |
| $Cr_2O_3$ | 2.0 | 1.50 | 1.8 | 1.5–2.2 |
| $CrO_3$ | 0.6 | 0.50 | 0.6 | 0.3–0.6 |
| $CoO$ | 2.69 | 2.22 | 2.4 | 2.2–3.0 |

Example I

In one specific embodiment of the present invention, the batch ingredients listed in the corresponding column of Table I are fired in a frit furnace at a melting temperature of about 2750° F. To produce the proper ratio of $Cr_2O_3/CrO_3$, the melting fires were slightly oxidizing. The molten colorant glass is suitably converted to powdered frit by feeding as a stream from the outlet of the melting furnace and chilling rapidly. The chilling is effected by flowing the molten stream through water-cooled rolls and then into a body of water so that the glass breaks up into granular frit form. If desired, the granular glass frit can then be further reduced in particle size by grinding. We have found that powdered frit glass particles in the range of from —8 to +30 mesh size are satisfactory for the purposes of this invention.

As an alternate method, the frit may be melted and directly fed into the forehearth as the molten colorant glass.

In any event, the theoretical composition of the frit glass based on the above-mentioned batch charge is listed in the corresponding column of Table II. The ratio of the essential colorants is set forth in Table III.

Example II

The corresponding frit glass of Table I is prepared according to the method of Example I. Compositional data is set forth in Table II and Table III.

Example III

The corresponding frit glass of Table I is prepared according to the method of Example I. Compositional data is set forth in Table II and Table III.

USE OF FRIT GLASSES

Before describing the manner in which the frits of this invention are incorporated into colorless base glasses to produce high color composite blue glasses, a description of suitable base glasses and desired composite glass optical properties will be provided to serve as an appropriate background upon which the invention can be superimposed.

THE PREPARATION OF BASE GLASSES

Base glasses that can be used in practicing the present invention may have an actual analysis of oxides encompassed within the ranges set out below. Generally, it will be found that glasses falling within these ranges are soda-lime-flint glasses commonly used in the manufacture of colorless containers.

RANGE OF OXIDES IN BASE GLASS COMPOSITIONS

| Constituent: | Percent by weight |
|---|---|
| $SiO_2$ | 60–75 |
| $Al_2O_3$ | 0.3–10 |
| $CaO + MgO$ | 6–15 |
| $Na_2O$ | 12–18 |
| $K_2O$ | 0–5 |
| $BaO$ | 0–5 |
| Decolorizers [1] | Trace |

[1] Any compatible decolorizer can be used. The function here is to mask the color produced by any iron that may be present as an impurity in the batch material. We have found that selenium in the range of 0.00025–0.00035% is effective.

TABLE IV.—SPECIFIC COMPOSITION OF A SUITABLE BASE GLASS

| Constituent: | Percent by weight |
|---|---|
| $SiO_2$ | 72.08 |
| $Al_2O_3$ | 1.70 |
| $Fe_2O_3$ | 0.039 |
| $CaO$ | 11.59 |
| $MgO$ | 1.00 |
| $Na_2O$ | 13.35 |
| $K_2O$ | 0.20 |
| Selenium | 0.00025–0.00035 |

The conditions and procedures for making the above base glass are conventional and such conditions are well known to those skilled in the art as exemplified in Table IX B–II on page 245 of "Handbook of Glass Manufacture" by Tooley, Ogden Publishing Company, New York, N.Y., 1953.

In accordance with the broad principles of the present invention, the frit glasses of the invention can be added to substantially any oxidized glass. Accordingly, the exemplary soda-lime-flint glass described is suggested as applicable for commercial container production.

DESCRIPTION OF OPTICAL PROPERTIES

The optical properties hereinafter set forth are C.I.E. colorimetric values based upon the I.C.I. Chromaticity Diagram. C.I.E. refers to the First International Commission of Illumination and the diagram from which the values are taken defines color in terms of mixtures of theoretical color lights. The C.I.E. system makes possible the exact specification of colors by means of a "color map." The C.I.E. system of color notation specifies the color of glasses in terms of brightness, purity and dominant wavelength.

"Brightness" which is usually expressed in terms of percentage is the amount of visual response to a normal observer from the radiation emergent from a transparent object relative to the response in this observer to the radiation incident upon this object. Thus, brightness may be briefly termed the lightness of color of an object.

"Purity," which is also normally expressed in terms of percentage, is a measure of the monochromaticness of a color with monochromatic light having a purity of 100%. By diluting the monochromatic radiation with white light made up of all wavelengths, we thereby dilute the color and reduce purity.

"Dominant Wave Length," usually expressed in millimicrons ($m\mu$), is the wavelength of monochromatic light appearing to the eye to have the same hue as the mixed light actually encountered. These concepts will be hereinafter discussed in relation to the finished composite glass.

COMPOSITE GLASS PRODUCTION

In the production of glass containers, a base glass is prepared in melting tanks of several hundred tons capacity. The batch constituents are added and proceed through the tank under melting and refining conditions. The glass is issued out of the fired end of the melting tank by being run through one or a plurality of forehearths which are provided in connection with the tank to feed container forming machines.

Generally, the colorless base glass issues from the melting tank into the forehearth at a temperature of about 2300° F. The frits made in accordance with the present invention are well adapted for addition to the base glass at such temperature conditions in finely divided form as from −8 to +30 mesh size. Stirring means and mixing baffles known in the art are used to produce homogeneous admixtures of the frit into the colorless base glass to produce a uniformly highly colored composite glass. A specific type of forehearth equipped with stirring is set forth in aforesaid FIG. 1.

Example IV

To produce a deep blue composite glass that exhibits excellent ultraviolet radiation protection, the frit of Example III was added to the forehearth of a furnace producing the base glass listed in Table IV at the rate of about 67 lb. of frit glass per ton of base glass. In practice, the amount of frit glass usually ranges from about 40 to about 80 lb./ton of base glass. The mixing was accomplished in an apparatus similar to that shown in FIG. 1. The frit was at ambient temperature and the base glass was about 2300° F. The blue composite glass was then formed into glass containers by conventional forming equipment.

The composite glass so produced had the following characteristics:

| | | Percent by weight |
|---|---|---|
| Dominant wavelength (millimicrons), 466.82 | | 460–475 |
| Purity, 88.58% | | 80–90 |
| Brightness, 0.24% | | 0.2–0.6 |

Optical measurements refer to 10 mm. thickness sample.

For reference purpose, the data for the standard Maryland Blue Glass for the same 10 mm. thickness is given:

| | |
|---|---|
| Dominant wavelength (millimicrons) | 445 |
| Purity, percent | 100 |
| Brightness, percent | 0.70 |

Complete color profiles for the above glasses are given in FIG. 2. This drawing clearly demonstrates the desirable short-wave absorption properties of a deep blue glass composition attainable through the practices in and teachings of the present invention in comparison with those of standard Maryland Blue Glass.

The following table shows the actual composition of the prepared composite glass. The data is presented by way of illustration and need not be interpreted necessarily as a limitation of the invention.

TABLE V

| Constituent of composite glass | Frit glass and base glass Table II-3 and Table IV | Preferred range |
|---|---|---|
| $SiO_2$ | 71.62 | 60–75 |
| $Al_2O_3$ | 1.70 | 0.3–10 |
| $Fe_2O_3$ | 0.044 | 0–0.05 |
| CaO | 11.30 } | 6–15 |
| MgO | 0.92 } |  |
| $Na_2O$ | 13.95 | 12–18 |
| $K_2O$ | 0.24 | 0–5 |
| CoO | 0.0735 | 0.03–0.1 |
| $CrO_3$ | 0.005 | 0.003–0.01 |
| $Cr_2O_3$ | 0.05 | 0.03–0.06 |

It is evident from the foregoing that the present invention provides: (1) new, optically desirable blue glass that exhibits exceptional absorption in the short-wave visible and ultraviolet radiation range, (2) a convenient economical method of preparing said blue glass by the addition of a highly colored frit glass to the forehearth of a furnace producing ordinary colorless soda-lime glass.

While the preferred embodiments have been described above in detail, it will be understood that numerous modifications might be resorted to without departing from the spirit and scope of the invention.

What is claimed is:

1. In a method of making a blue, ultraviolet absorbent, soda-lime glass, the steps of preparing a molten colorless, soda-lime base glass, flowing the molten base glass through a forehearth, dissolving in the molten glass in the forehearth a highly enriched colorant frit consisting essentially of a soda-lime flint glass composition containing from about 1.5 to about 2.2% total chromium calculated as $Cr_2O_3$, from about 0.3 to about 0.6% $CrO_3$ calculated as $CrO_3$, said recited range amount of $Cr_2O_3$ in said frit being adjusted to accommodate the amount of $CrO_3$, and from about 2.2 to about 3.0% CoO and forming a composite blue glass, the amount of said colorant frit dissolved in said base glass ranging from 1% to 5% by weight of the molten base glass.

2. In a method of making a colored glass composition, the steps of preparing a substantially colorless molten base glass having the following composition:

| Oxide: | Percent range |
|---|---|
| $SiO_2$ | 60–70 |
| $Al_2O_3$ | 0.3–10 |
| CaO+MgO | 6–15 |
| $Na_2O$ | 12–18 |
| $K_2O$ | 0–5 |
| BaO | 0–5 |
| Selenium | 0.00025–0.00035 | and adding to said molten glass a highly colored frit prepared from a batch of the following proportions by weight:

| Ingredients: | Parts |
|---|---|
| Sand | 2000 |
| Soda ash | 1151–1172 |
| Limestone | 557–559 |
| Potassium dichromate | 98–135 |
| Black cobalt oxide | 81–102 | dissolving said frit in said molten glass under exposure to temperature and oxidizing conditions yielding a final colored glass composition containing from about 0.03 to about 0.06% total chromium calculated as $Cr_2O_3$, 0.003 to 0.01% $CrO_3$ and 0.03 to 0.1% CoO and said final glass composition having C.I.E. colorimetric values for 10 millimeter thickness of about 0.2 to 0.6% brightness, 80 to 90% purity, and 460 to 475 millimicrons dominant wavelength.

3. A frit composition comprising a soda-lime flint glass which is highly colorant enriched and which consists essentially of the following ingredients in the indicated percentages by weight:

| Ingredient: | Percent by weight |
|---|---|
| $SiO_2$ | 60–65 |
| $Al_2O_3$ | 0.0–0.1 |
| $Fe_2O_3$ | 0.0–0.05 |
| CaO | 8.5–9.5 |
| MgO | 0.0–1.0 |
| $Na_2O$ | 18.0–23.0 |
| $K_2O$ | 0.0–2.0 |
| Total Cr as $Cr_2O_3$ | [1] 1.5–2.2 |
| $CrO_3$ | 0.3–0.6 |
| CoO | 2.2–3.0 |

[1] The amount of $Cr_2O_3$ being adjusted to accommodate the amount of $CrO_3$.

4. A frit composition as described in claim 3, wherein the specific composition is:

| Ingredient: | Percent by weight |
|---|---|
| $SiO_2$ | 62.95 |
| $Al_2O_3$ | 0.07 |
| $Fe_2O_3$ | 0.025 |
| CaO | 9.04 |
| MgO | 0.67 |
| $Na_2O$ | 21.19 |
| $K_2O$ | 1.25 |
| Total Cr as $Cr_2O_3$ | 2.00 |
| $CrO_3$ | 0.60 |
| CoO | 2.80 |

5. A frit composition as described in claim 3, wherein the specific composition is:

| Ingredient: | Percent by weight |
|---|---|
| $SiO_2$ | 63.46 |
| $Al_2O_3$ | 0.07 |
| $Fe_2O_3$ | 0.026 |
| CaO | 9.13 |
| MgO | 0.67 |
| $Na_2O$ | 21.61 |
| $K_2O$ | 1.01 |
| Total Cr calculated as $Cr_2O_3$ [1] | 1.61 |
| CoO | 2.42 |

[1] A proportion of said Cr being present as $CrO_3$ calculated as $CrO_3$ and consisting of 0.50 percent by weight.

6. A frit composition as described in claim 3, wherein the specific composition is:

| Ingredient: | Percent by weight |
|---|---|
| $SiO_2$ | 62.70 |
| $Al_2O_3$ | 0.07 |
| $Fe_2O_3$ | 0.025 |
| CaO | 9.00 |
| MgO | 0.67 |
| $Na_2O$ | 20.98 |
| $K_2O$ | 1.37 |
| Total Cr calculated as $Cr_2O_3$ [1] | 2.2 |
| CoO | 2.99 |

[1] An amount of said $Cr_2O_3$ being present as $CrO_3$, said amount being about 0.6 calculated as $CrO_3$ percent by weight.

7. The method as claimed in claim 1, wherein said highly enriched colorant frit is in finely divided form.

8. The method as claimed in claim 7, wherein said frit in finely divided form measures from —8 to +30 mesh size.

References Cited

UNITED STATES PATENTS

| 3,291,621 | 12/1966 | Hagedorn | 106—52 |
| 2,923,636 | 2/1960 | Swain | 106—52 |
| 3,330,638 | 7/1967 | Brown | 106—54 |

HELEN M. McCARTHY, Primary Examiner

U.S. Cl. X.R.

106—48, 52

UNITED STATES PATENT OFFICE
CERTIFICATE OF CORRECTION

Patent No. 3,523,779                    Dated August 11, 1970

Inventor(s)  H. R. Keshari and W. F. Mahoney

It is certified that error appears in the above-identified patent and that said Letters Patent are hereby corrected as shown below:

Column 1, line 20 after "soda-lime" insert --glass--. Column 2, line 21, "utlizing" should be --utilizing--. Column 3, line 48, "31" should be --13--.

Signed and sealed this 10th day of June 1975.

(SEAL)
Attest:

RUTH C. MASON
Attesting Officer

C. MARSHALL DANN
Commissioner of Patents
and Trademarks